United States Patent
An et al.

(10) Patent No.: US 9,448,350 B2
(45) Date of Patent: Sep. 20, 2016

(54) BACKLIGHT UNIT AND DISPLAY DEVICE INCLUDING THE SAME

(71) Applicant: SAMSUNG ELECTRONICS CO., LTD., Suwon-si (KR)

(72) Inventors: Jun Seok An, Suwon-si (KR); Jae Hyun Park, Seoul (KR); Chang Hwa Baek, Suwon-si (KR); Sung Ho Song, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 14/052,137

(22) Filed: Oct. 11, 2013

(65) Prior Publication Data

US 2014/0104877 A1  Apr. 17, 2014

(30) Foreign Application Priority Data

Oct. 12, 2012 (KR) .................. 10-2012-0113245

(51) Int. Cl.
*F21V 7/00* (2006.01)
*F21V 8/00* (2006.01)

(52) U.S. Cl.
CPC ........... *G02B 6/0031* (2013.01); *F21V 7/0025* (2013.01); *G02B 6/0088* (2013.01)

(58) Field of Classification Search
CPC  G02B 6/0091; G02B 6/0013; G02B 6/0015; G02B 6/0023; G02B 6/0031
USPC ............................. 362/608, 621, 622; 349/65
See application file for complete search history.

(56) References Cited

U.S. PATENT DOCUMENTS

| | | | | |
|---|---|---|---|---|
| 5,688,035 | A | * | 11/1997 | Kashima et al. ............. 362/609 |
| 7,357,556 | B1 | * | 4/2008 | Liao ..................... G02B 6/0031 349/65 |
| 7,530,723 | B2 | * | 5/2009 | Ohno ..................... G02B 6/005 362/612 |
| 7,729,589 | B2 | * | 6/2010 | Chou et al. ................... 362/632 |
| 8,659,718 | B2 | * | 2/2014 | Sekiguchi et al. ............. 349/58 |
| 2001/0053073 | A1 | | 12/2001 | Itoh et al. |
| 2002/0012243 | A1 | | 1/2002 | Matsushita |
| 2008/0175022 | A1 | * | 7/2008 | Sugiura et al. ............... 362/609 |
| 2012/0230008 | A1 | * | 9/2012 | Ajichi et al. .................... 362/19 |

FOREIGN PATENT DOCUMENTS

WO  2012/161155 A1  11/2012

OTHER PUBLICATIONS

Communication dated Jan. 20, 2014, issued by the European Patent Office in counterpart European Application No. 13187163.4.

* cited by examiner

*Primary Examiner* — Peggy Neils
(74) *Attorney, Agent, or Firm* — Sughrue Mion, PLLC

(57) ABSTRACT

A backlight unit includes a light guide plate; a light emitting unit configured to irradiate light toward a side portion of the light guide plate, the side portion comprising an upper side part and a lower side part; and a light controller of which at least a portion is in at least one from among the upper and the lower side parts of the side portion of the light guide plate. The light controller includes a first region overlapping the light guide plate and a second region not overlapping the light guide plate, and a reflectivity of the first region is different from a reflectivity of the second region.

34 Claims, 6 Drawing Sheets

BACKLIGHT UNIT AND DISPLAY DEVICE INCLUDING THE SAME

CROSS-REFERENCE TO RELATED APPLICATION(S)

This application claims priority from Korean Patent Application No. 2012-0113245, filed on Oct. 12, 2012, in the Korean Intellectual Property Office, the disclosure of which is incorporated herein by reference in its entirety.

BACKGROUND

1. Field

Apparatuses and methods consistent with exemplary embodiments relate to a backlight unit and a display device including the same to improve luminous efficacy and reduce screen defects.

2. Description of the Related Art

Recently, a variety of display devices have been developed to reduce thickness, weight, and power consumption.

Representative examples of such display devices include liquid crystal display (LCD) devices which display images using electric and optical properties of liquid crystals.

An LCD device includes a liquid crystal display panel to optically display an image and a backlight unit (BLU) to supply light to the liquid crystal display panel.

In the related art, a cold cathode fluorescent lamp (CCFL) is widely used as a light source of the backlight unit (BLU). However, recently, a light emitting diode (LED) having advantages in terms of properties such as weight, thickness, power consumption, and lifespan is generally used.

The light emitting diode may be disposed at a side of a light guide plate and emits light toward the light guide plate. In this case, the emitted light may not be entirely incident upon the light guide plate and thus leaks.

Accordingly, in the related art, as shown in FIG. 1, to prevent light leakage, a reflector 3 to reflect leaked light is required between the light guide plate 1 and the light emitting diode 2.

However, although the reflector 3 is disposed between the light guide plate 1 and the light emitting diode 2, light irradiated upon an edge of the light guide plate 1 is reflected, thereby forming a bright section 4 of a display device and causing screen defects.

The screen defects become more serious when a bezel width W, which is a distance from an end portion of an active area of the display device to a peripheral edge of the display device, as shown in FIG. 1, becomes considerably narrower or wider.

SUMMARY

One or more exemplary embodiments provide a backlight unit and a display device including the same to improve luminous efficacy and reduce screen defects.

Additional and/or other aspects will be set forth in part in the description which follows and, in part, will be obvious from the description, or may be learned by practice.

In accordance with an aspect of an exemplary embodiment, a backlight unit includes a light guide plate, a light emitting unit configured to irradiate light toward a side portion of the light guide plate, the side portion comprising an upper side part and a lower side part, and a light controller of which at least a portion is in at least one from among the upper and lower side parts of the side portion of the light guide plate, wherein the light controller includes a first region overlapping the light guide plate and a second region not overlapping the light guide plate, and a reflectivity of the first region is different from a reflectivity of the second region.

The reflectivity of the first region may be lower than the reflectivity of the second region.

The first region may substantially absorb light and the second region may substantially reflect light.

The first region may comprise a first material and the second region may comprise a second material that is different from the first material.

The first region may contact the light guide plate.

A horizontal distance between the light emitting unit and the light controller may be about 1 mm or less.

A length of the first region may be greater than a length of the second region.

In accordance with an aspect of another exemplary embodiment, a backlight unit includes a light guide plate, a light emitting unit configured to irradiate light toward a side portion of the light guide plate, the side portion comprising an upper side part and a lower side part, and a light controller of which at least a portion is in at least one from among the upper and the lower side parts of the side portion of the light guide plate, wherein the light controller includes a first region overlapping the light guide plate, and a second region and a third region, each not overlapping the light guide plate, and a reflectivity of the first region is different from a reflectivity of the third region.

The reflectivity of the first region may be lower than the reflectivity of the third region.

The first region and the second region may substantially absorb light and the third region may substantially reflect light.

The first region and the second region may comprise substantially identical materials, and the first region may comprise a first material and the third region may comprise a second material that is different from the first material.

The first region may contact the light guide plate.

A horizontal distance between the light emitting unit and the light controller may be about 1 mm or less.

A length of the first region may be greater than a length of the second region.

A length of the first region may be greater than a length of the third region and a length of the third region may be greater than a length of the second region.

In accordance with an aspect of still another exemplary embodiment, a display device includes a display panel, a light guide plate provided at a rear side of the display panel, a light emitting unit to irradiate light toward a side portion of the light guide plate, the side portion comprising an upper side part and a lower side part, and a light controller of which at least a portion is in at least one from among the upper and the lower side parts of the side portion of the light guide plate, wherein the light controller includes a first region overlapping the light guide plate and a second region not overlapping the light guide plate, and a reflectivity of the first region is different from a reflectivity of the second region.

The reflectivity of the first region may be lower than the reflectivity of the second region.

The first region may substantially absorb light and the second region may substantially reflect light.

The first region may comprise a first material and the second region may comprise a second material that is different from the first material.

The first region may contact the light guide plate.

A horizontal distance between the light emitting unit and the light controller may be about 1 mm or less.

A length of the first region may be greater than a length of the second region.

In accordance with an aspect of still another exemplary embodiment, a display device includes a display panel, an optical sheet disposed in a lower part of the display panel, a light guide plate provided at a rear side of the display panel, a light emitting unit to irradiate light toward a side portion of the light guide plate, the side portion comprising an upper side part and a lower side part, and a light controller of which at least a portion is in at least one from among the upper and the lower side parts of the side portion of the light guide plate, wherein the light controller includes a first region overlapping the light guide plate, and a second region and a third region, each not overlapping the light guide plate, and a reflectivity of the first region is different from a reflectivity of the third region.

The reflectivity of the first region may be lower than the reflectivity of the third region.

The first region and the second region may substantially absorb light and the third region may substantially reflect light.

The first region and the second region may comprise substantially identical materials, and the first region may comprise a first material and the third region may comprise a second material that is different from the first material.

The first region may contact the light guide plate.

A horizontal distance between the light emitting unit and the light controller may be about 1 mm or less.

A length of the first region may be greater than a length of the second region.

A length of the first region may be greater than a length of the third region and a length of the third region may be greater than a length of the second region.

In accordance with an aspect of still another exemplary embodiment, a reflective sheet of a display device including a display panel, a light guide plate, and a light emitting unit, wherein the reflective sheet is provided between the light guide plate and the light emitting unit to guide light emitted from the light emitting unit toward the display panel, includes a first reflective region having a first reflectivity and a second reflective region having a second reflectivity. The first reflectivity is different from the second reflectivity and the first reflective region is positioned corresponding to an edge portion of the light guide plate.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
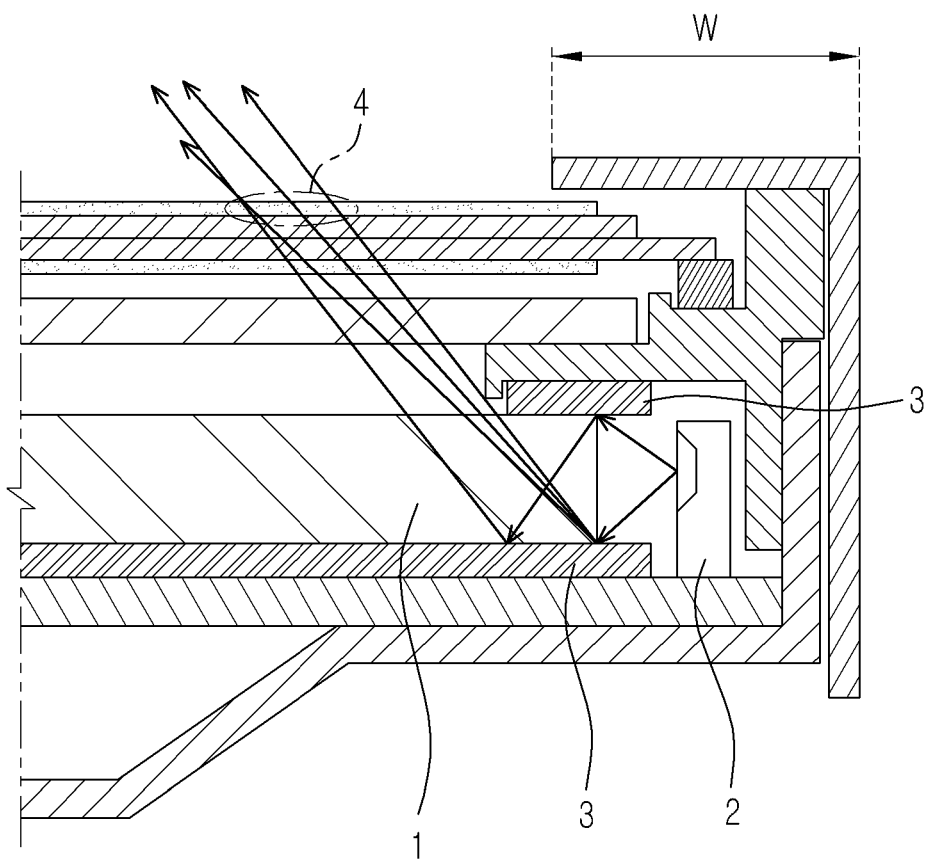
FIG. 1 illustrates a configuration of a related art display device.

Reference will now be made in detail to certain exemplary embodiments, which are illustrated in the accompanying drawings, wherein like reference numerals refer to like elements throughout.

Figure 2:
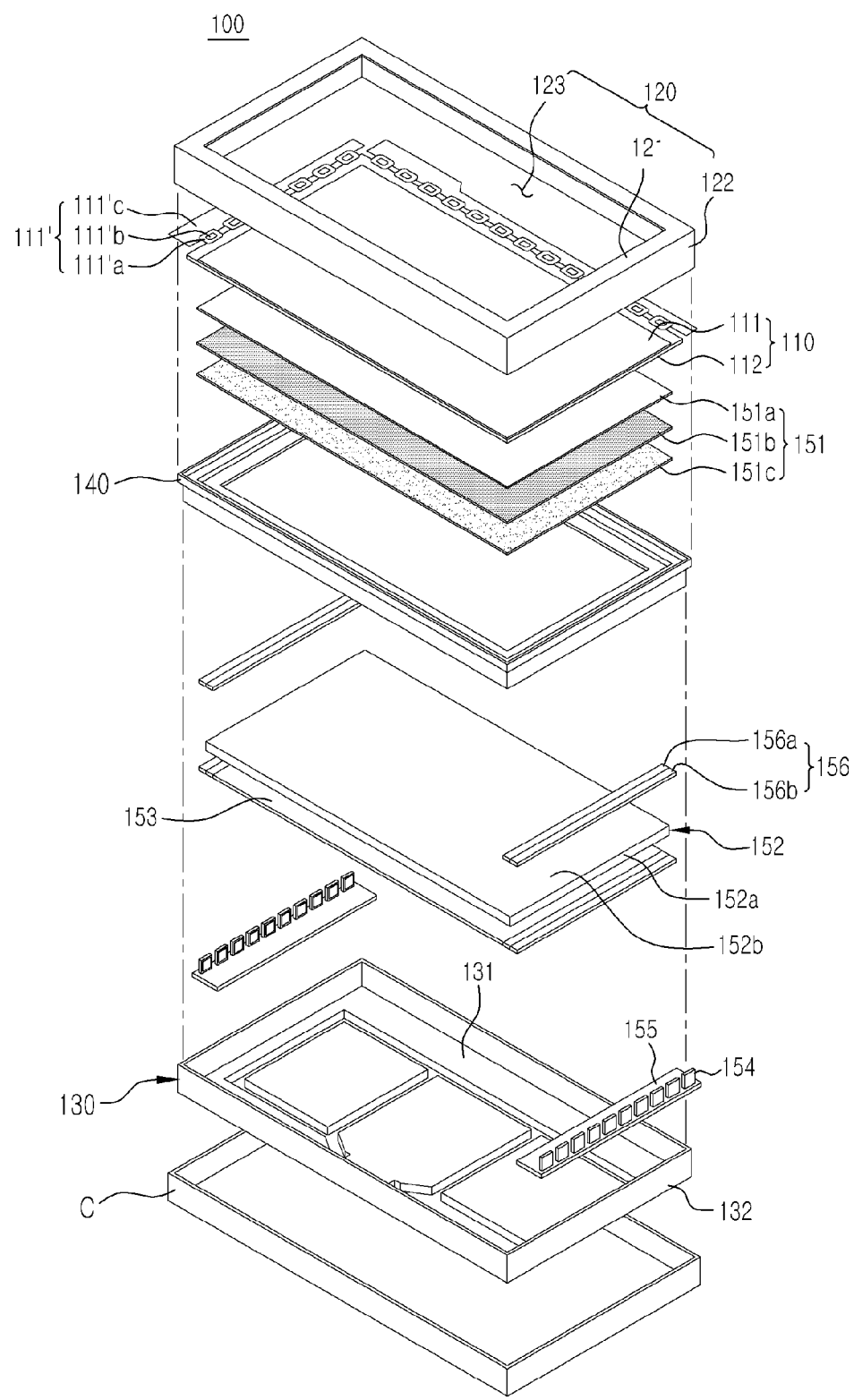
FIG. 2 is an exploded perspective view illustrating a display device including a backlight unit according to an exemplary embodiment.
Figure 3:
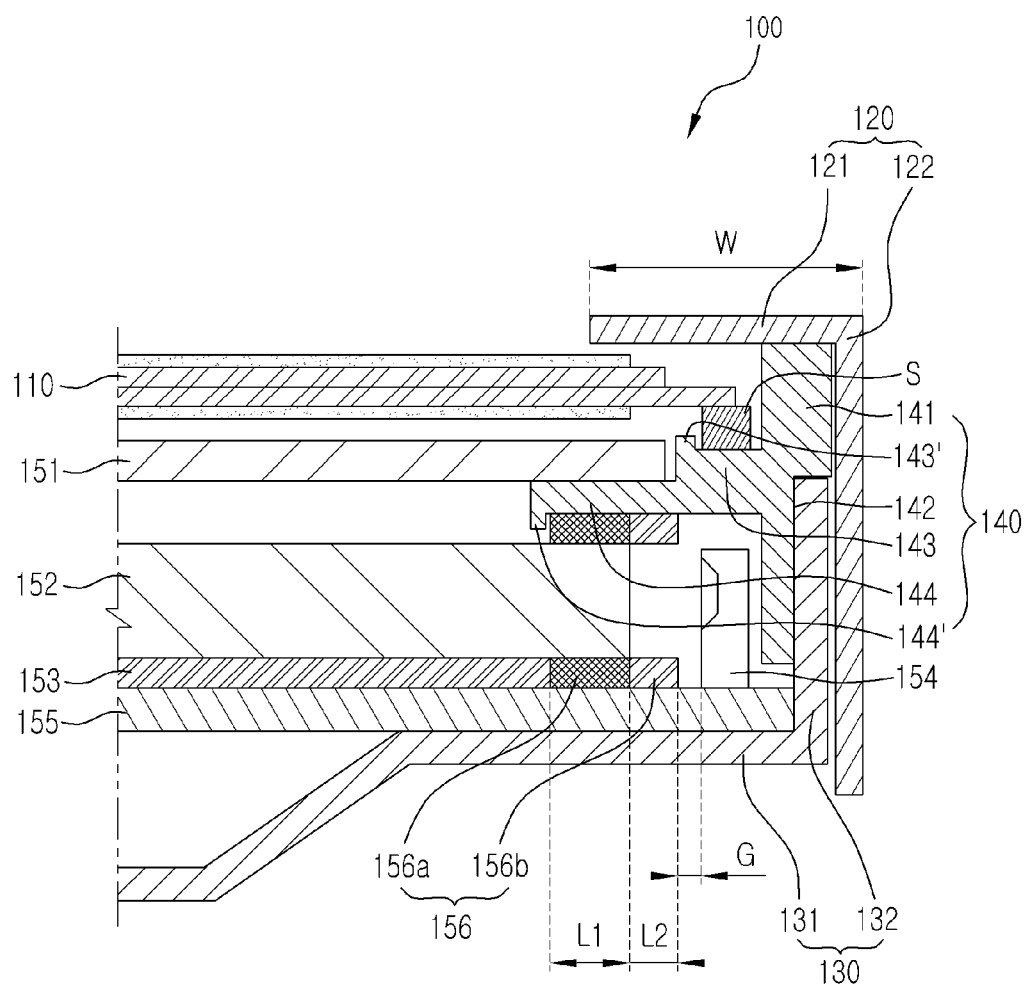
FIG. 3 is a sectional view illustrating a backlight unit and a part of a display device including the same according to an exemplary embodiment.

FIG. 2 is an exploded perspective view illustrating a display device 100 including a backlight unit according to an exemplary embodiment. FIG. 3 is a sectional view illustrating a backlight unit and a part of the display device 100 including the same according to an exemplary embodiment. Hereinafter, a backlight unit and the display device 100 including the same according to an exemplary embodiment will be described with reference to FIGS. 2 and 3.

Referring to FIGS. 2 and 3, the display device 100 including a backlight unit according to an exemplary embodiment includes a display panel 110, a top chassis 120, a bottom chassis 130, a middle mold 140 and a backlight unit. The backlight unit includes an optical sheet 151, a light guide plate 152, a reflective sheet 153, a light emitting diode 154, a printed circuit board 155 and a light controller 156.

The display panel 110 receives light from the backlight unit disposed at a rear thereof, modulates arrangement of the liquid crystal layers (not shown) refracted in different patterns, and thus displays an image.

The display panel 110 includes a thin film transistor substrate 111 including a thin film transistor (not shown), a color filter substrate 112 facing the thin film transistor substrate 111, and a liquid crystal layer (not shown) provided between the thin film transistor substrate 111 and the color filter substrate 112.

A driver 111' for applying a driving signal to the thin film transistor substrate 111 is provided at a side portion of the thin film transistor substrate 111.

The driver 111' includes a flexible printed circuit board 111'a, a driving chip 111'b mounted on the flexible printed circuit board 111'a, and a circuit board 111'c connected to a side portion of the flexible printed circuit board 111'a.

The flexible printed circuit board 111'a may be a chip-on-film in which a chip device is mounted on a base film and may be a tape carrier package (TCP) or a chip on glass (COG) in which a tape automated bonding (TAB) method is used.

The top chassis 120 is disposed at a front side of the display panel 110 to constitute an outer appearance of the display device 100.

The top chassis 120 includes a bezel 121 surrounding an edge of the display panel 110 and a top side 122 extending downwardly from the bezel 121 toward a side of the bottom chassis 130. The top chassis 120 is provided at a front surface thereof with an opening 123 to expose an active area, in which an image is displayed, of the display panel outwardly from the front surface thereof.

The bottom chassis 130 is received by the top chassis 120 to constitute an outer appearance of the display device 100 together with the top chassis 120.

The bottom chassis 130 includes a bottom surface 131, on which the backlight unit is mounted, and a bottom side 132 protruding and extending upwardly from a circumference of the bottom side 131.

In addition, a cover C may be disposed in a rear side of the bottom chassis 130.

The middle mold 140 is disposed between the top chassis 120 and the bottom chassis 130 to support the display panel 110 and the backlight unit and includes an upper flange 141, a lower flange 142, a first extension portion 143 and a second extension portion 144.

In an exemplary embodiment, the upper flange 141, the lower flange 142, the first extension portion 143 and the second extension portion 144 of the middle mold 140 may be integrated with one another.

The upper flange 141 extends upwardly in a direction substantially parallel to an outer surface of the bottom side 132 of the bottom chassis 130. In an exemplary embodiment, one outer surface of the upper flange 141 may have a level substantially the same or similar to the outer surface of the bottom side 132 of the bottom chassis 130.

The lower flange 142 extends downwardly while forming a step with the upper flange 141.

As such, since the step is formed between the upper flange 141 and the lower flange 142, the middle mold 140 may be disposed corresponding to the top chassis 120 and the bottom chassis 130 received by the top chassis 120.

The first extension portion 143 extends inwardly from the upper flange 141 of the middle mold 140 and supports the display panel 110.

In addition, the first extension portion 143 is provided with a support S to support the display panel 110. The first extension portion 143 may be provided at an end portion thereof with a protrusion 143' to prevent the support S from escaping.

The second extension portion 144 extends inwardly from the lower flange 142 of the middle mold 140 and supports the optical sheet 151 of the backlight unit, which will be described later.

In addition, the second extension portion 144 is provided at an end portion thereof with a protrusion 144' extending downwardly to support the light controller 156 of the backlight unit.

Hereinafter, elements of the backlight unit will be described in detail.

The optical sheet 151 is disposed in a rear side of the display panel 110 and includes a protective film 151a, a prism film 151b, a diffusion film 151c and the like.

The protective film 151a is disposed in an upper part of the prism film 151b to protect the prism film 151b, which is vulnerable to scratches from, for example, dust.

The prism film 151b is provided on an upper surface thereof with a plurality of triangular prisms (not shown) arranged in a predetermined pattern, to focus light diffused from the diffusion film 151c in a direction substantially vertical to a plane surface of the display panel 110. The prism film 151b generally includes two prism films 151b and a micro-prism (not shown) formed in each prism film 151b forms a predetermined angle.

The diffusion film 151c has a structure in which a coating layer (not shown) having a bead shape is provided on a base substrate thereof to diffuse light transferred from the light guide plate 152 and supply the same to the display panel 110.

The light guide plate 152 is disposed in a rear side of the optical sheet 151 to substantially uniformly supply light from the light emitting diode 154 to the diffusion film 151c.

In addition, the light guide plate 152 is provided at a side end portion thereof with an incident surface 152a, upon which light from the light emitting diode 154 is incident. The light guide plate 152 is further provided with an emission surface 152b facing the diffusion film 151c and a reflective surface (not shown) provided parallel to the emission surface 152b.

The light guide plate 152 may comprise an acrylic resin such as, for example, polymethlymethacrylate (PMMA) or polymethylstyrene.

The reflective sheet 153 is disposed in a lower part of the light guide plate 152 to guide light from a lower surface of the light guide plate 152 to the light guide plate 152. The reflective sheet 153 may comprise a plastic material such as, for example, polyethylene terephthalate (PET) or polycarbonate (PC).

The light emitting diode 154 emits light toward the incident surface 152a of the light guide plate 152 and is mounted on the printed circuit board 155. The light emitting diode 154 may include a plurality of light emitting diodes to irradiate light toward the incident surface 152a of the light guide plate 152.

In addition, the display device 100 may use a light emitting unit such as a fluorescent lamp (not shown), in addition to the light emitting diode 154, to irradiate light toward the incident surface 152a of the light guide plate 152.

The printed circuit board 155 applies an electric signal to the light emitting diode 154. The printed circuit board 155 may include a plurality of printed circuit boards 155, which are disposed at left and right sides of the bottom chassis 130.

A part of the light controller 156 is disposed at upper and lower side parts of the light guide plate 152 and the light controller 156 includes a first region 156a overlapping the light guide plate 152 and a second region 156b not overlapping the light guide plate 152.

A reflectivity of the first region 156a overlapping the light guide plate 152 may be different from that of the second region 156b not overlapping the light guide plate 152.

In this case, a reflectivity of the first region 156a overlapping the light guide plate 152 may be lower than that of the second region 156b not overlapping the light guide plate 152.

In an exemplary embodiment, the first region 156a of the light controller 156 may substantially absorb light and the second region 156b may substantially reflect light.

When the first region 156a overlapping the light guide plate 152 absorbs light, a bright section in the display device 100 caused by light refracted or reflected from an edge of the light guide plate 152 may be prevented.

In addition, when the second region 156b not overlapping the light guide plate 152 reflects light, leakage of light irradiated from the light emitting diode 154 may be prevented and luminous efficacy may thus be improved.

A length L1+L2 of the light controller 156 corresponds to a sum of a length L1 of the first region 156a and a length L2 of the second region 156b, and a horizontal distance G between the light controller 156 and the light emitting diode 154 corresponds to a distance obtained by subtracting the length L2 of the second region 156b from a distance L2+G between the light guide plate 152 and the light emitting diode 154.

In addition, the length L1 of the first region 156a and the length L2 of the second region 156b may be determined based on the distance L2+G between the light guide plate 152 and the light emitting diode 154. The length L1 of the first region 156a may be greater than the length L2 of the second region 156b to absorb various light refracted or reflected from the edge of the light guide plate 152.

In addition, the length L1 of the first region 156a may be smaller than the distance L2+G between the light guide plate 152 and the light emitting diode 154.

As such, when the length L1 of the first region 156a is greater than the length L2 of the second region 156b, various light refracted or reflected from the edge of the light guide plate 152 may be efficiently absorbed.

In an exemplary embodiment, the horizontal distance G between the light controller 156 and the light emitting diode 154 may be about 1 mm or less. Accordingly, a bezel width W may be reduced.

The first region 156a of the light controller 156 may contact the light guide plate 152 to efficiently absorb light refracted or reflected from the edge of the light guide plate 152.

In addition, the first region 156a and the second region 156b of the light controller 156 may comprise materials having different reflectivities.

In an exemplary embodiment, the first region 156a may comprise a substantially black or gray material to efficiently absorb light and the second region 156b may comprise a substantially white material to efficiently reflect light.

In addition, the first region 156a may comprise a material having an absorbance of 95% or more.

In addition, the second region 156b may comprise a material having a reflectivity of 95% or more.

Hereinafter, another exemplary embodiment of a backlight unit and a display device including the same will be described with reference to FIGS. 4 to 6.

Figure 4:
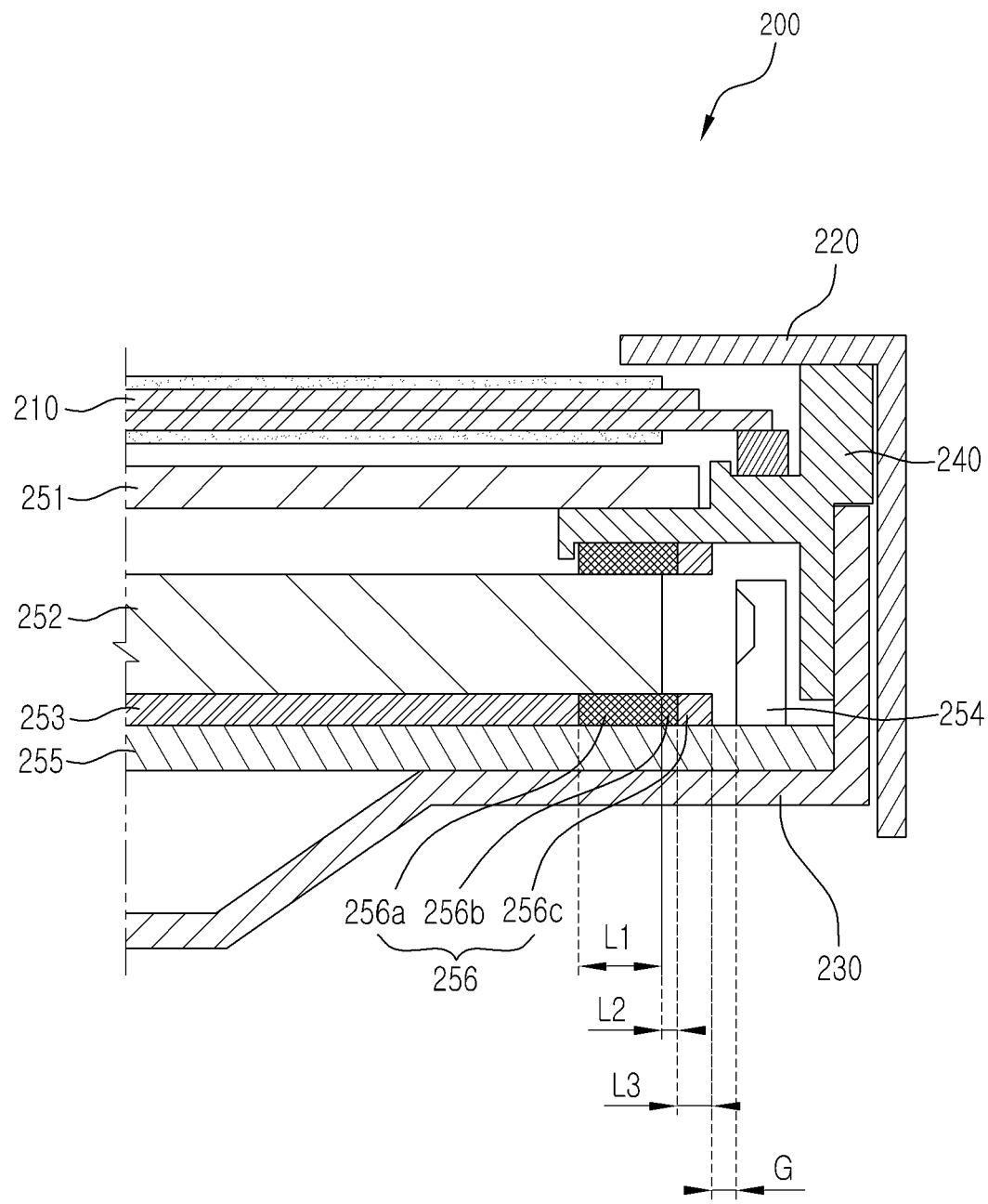
FIG. 4 is a sectional view illustrating a backlight unit and a part of a display device including the same according to another exemplary embodiment.

FIG. 4 is a sectional view illustrating a backlight unit and a part of a display device 200 including the same according to another exemplary embodiment. FIGS. 5 and 6 are views for explaining an operation of the backlight unit as shown in FIG. 4.

Figure 5:
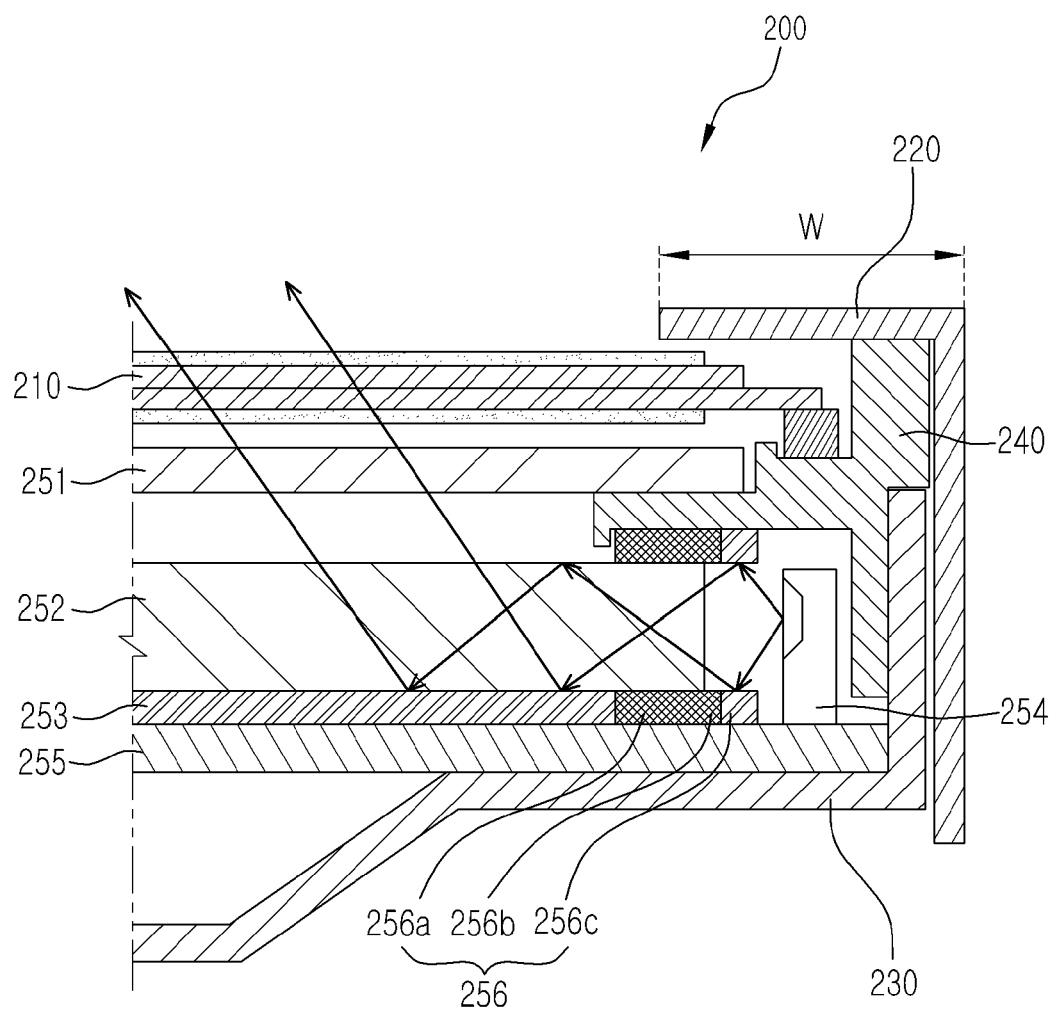
FIG. 5 is a view for explaining an operation of the backlight unit shown in FIG. 4.
Figure 6:
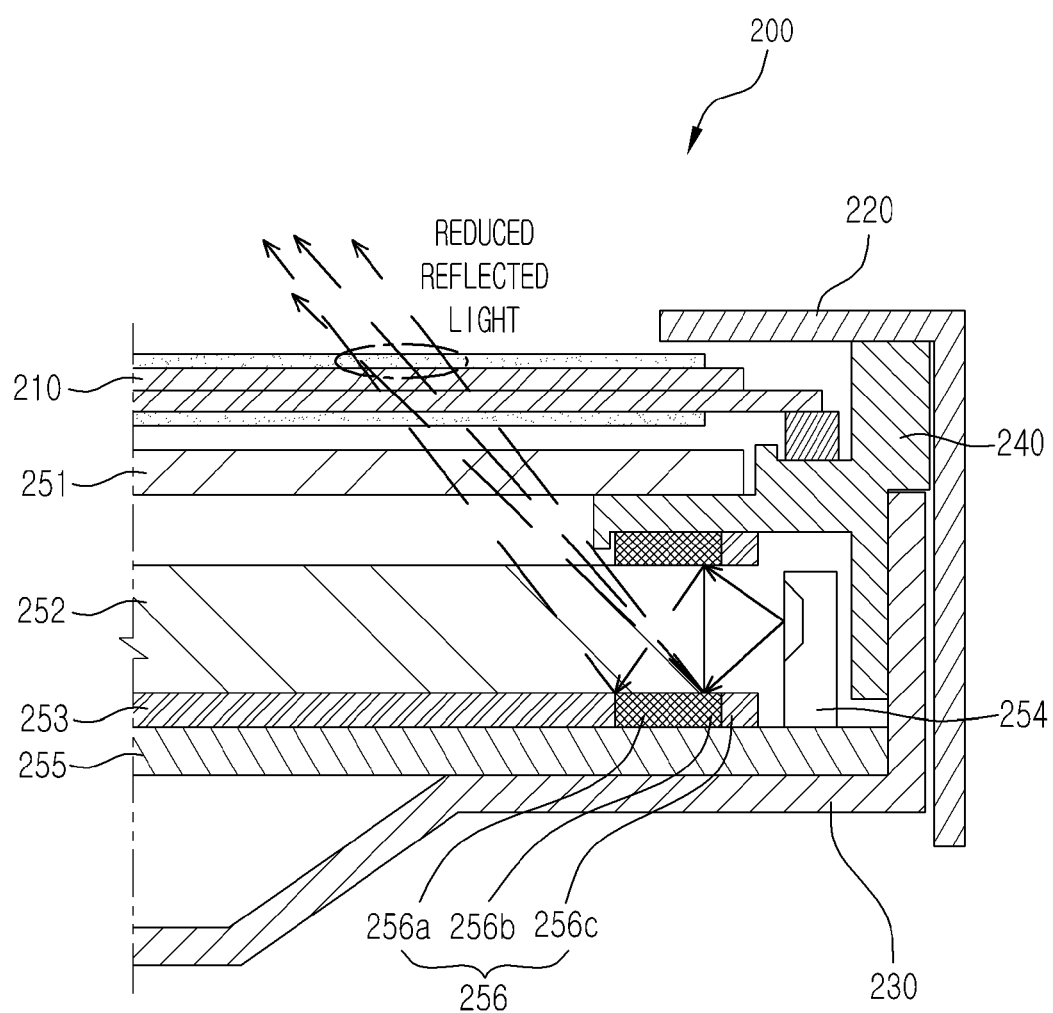
FIG. 6 is another view for explaining an operation of the backlight unit shown in FIG. 4.

Referring to FIGS. 4 to 6, the display device 200 including a backlight unit according to another exemplary embodiment includes a display panel 210, a top chassis 220, a bottom chassis 230, a middle mold 240 and a backlight unit.

The display panel 210, the top chassis 220, the bottom chassis 230 and the middle mold 240 have the same configurations as the display panel 110, the top chassis 120, the bottom chassis 130 and the middle mold 140 according to the exemplary embodiment of FIG. 3, and a detailed explanation thereof is thus omitted.

The backlight unit includes an optical sheet 251, a light guide plate 252, a reflective sheet 253, a light emitting diode 254, a printed circuit board 255 and a light controller 256.

The optical sheet 251, the light guide plate 252, the reflective sheet 253, the light emitting diode 254 and the printed circuit board 255 have the same configurations as the optical sheet 151, the light guide plate 152, the reflective sheet 153, the light emitting diode 154 and the printed circuit board 155 according to the exemplary embodiment of FIG. 3, and a detailed explanation thereof is thus omitted.

A part of the light controller 256 is disposed at upper and lower side parts of the light guide plate 252 and the light controller 256 includes a first region 256a overlapping the light guide plate 252, and a second region 256b and a third region 256c, each not overlapping the light guide plate 252.

A reflectivity of the first region 256a overlapping the light guide plate 252 may be different from that of the third region 256c.

In an exemplary embodiment, a reflectivity of the first region 256a overlapping the light guide plate 252 may be equivalent to that of the second region 256b not overlapping the light guide plate 252 and may be lower than that of the third region 256c.

In an exemplary embodiment, the first region 256a and the second region 256b of the light controller 256 may substantially absorb light and the third region 256c may substantially reflect light.

As such, when the first region 256a overlapping the light guide plate 252 and the second region 256b not overlapping the light guide plate 252 substantially absorb light, a bright section in the display device 200 caused by light refracted or reflected from an edge of the light guide plate 252 may be prevented (See FIG. 6).

In addition, when the third region 256c not overlapping the light guide plate 252 reflects light, leakage of light irradiated from the light emitting diode 254 may be prevented and luminous efficacy may thus be improved (See FIG. 5).

A length L1'+L2'+L3' of the light controller 256 corresponds to a sum of a length L1' of the first region 256a, a length L2' of the second region 256b and a length L3' of the third region 256c, and a horizontal distance G between the light controller 256 and the light emitting diode 254 corresponds to a distance obtained by subtracting the length L2' of the second region 256b and the length L3' of the third region 256c from a distance L2'+L3'+G between the light guide plate 252 and the light emitting diode 254.

In addition, the length L1' of the first region 256a, the length L2' of the second region 256b and the length L3' of the third region 256c may be determined based on the distance L2'+L3'+G between the light guide plate 252 and the light emitting diode 254. The length L1' of the first region 256a may be greater than the length L3' of the third 256c to absorb various light refracted or reflected from the edge of the light guide plate 252.

In addition, the length L2' of the second region 256b may be smaller than the length L3' of the third region 256c.

In an exemplary embodiment, the length L1' of the second region 256a is smaller than the distance L2'+L3'+G from the light guide plate 252 to the light emitting diode 254, the length L2' of the second region 256b is smaller than the length L3' of the third region 256c, and the length L3' of the third region 256c is smaller than the length L1' of the first region 256a.

As such, when the length L1' of the first region 256a is greater than the length L2' of the second region 256b, various light refracted or reflected from the edge of the light guide plate 252 may be efficiently absorbed.

In an exemplary embodiment, the horizontal distance G between the light controller 256 and the light emitting diode 254 may be 1 mm or less. Accordingly, the bezel width W may be reduced.

The first region 256a of the light controller 256 may contact the light guide plate 252 to efficiently absorb light refracted or reflected at an edge of the light guide plate 252.

In addition, the first region 256a and the second region 256b of the light controller 256 may be integrated with each other using the same material and the second region 256b and the third region 256c may comprise materials having different reflectivities.

In an exemplary embodiment, the first region 256a and the second region 256b may comprise a substantially black or gray material to efficiently absorb light, and the third region 256c may comprise a substantially white material to efficiently reflect light.

In addition, the first region 256a and the second region 256b may comprise a material having an absorbance of about 95% or more.

In addition, the third region 256c may comprise a material having a reflectivity of about 95% or more.

As is apparent from the above, a backlight unit and a display device including the same according to exemplary embodiments may improve luminous efficacy and reduce formation of bright sections by using light controllers having different reflectivities.

In addition, a backlight unit and a display device including the same according to exemplary embodiments may substantially reduce formation of bright sections and improve luminous efficacy by using a light controller for substantially absorbing light and another light controller for substantially reflecting light.

A backlight unit and a display device including the same according to exemplary embodiments may have an economic advantage in that a screen region (or an active area) may be increased due to a decreased bezel width, since a distance between the light controller and the light emitting diode may be reduced to, for example, 1 mm or less.

Furthermore, a backlight unit and a display device including the same according to exemplary embodiments may efficiently absorb various light refracted or reflected from an edge of a light guide plate, since a length of a light-absorbing region of the light controller is greater than a length of a light-reflecting region thereof.

Although a few exemplary embodiments have been shown and described, it would be appreciated by those skilled in the art that many alternatives, modifications, and variations may be made without departing from the principles and spirit of the disclosure, the scope of which is defined in the claims and their equivalents.

What is claimed is:

1. A backlight unit of a display device, the display device comprising a display panel, the backlight unit, and a middle mold configured to support the display panel and the backlight unit, wherein the middle mold comprises a lower portion extending in a direction substantially perpendicular to the display panel, and an extension portion extending from the lower portion and disposed between the display panel and at least a portion of the backlight unit, the backlight unit comprising:
   a light guide plate comprising an upper portion that is supported by the extension portion of the middle mold;
   a light emitting unit configured to irradiate light toward a side portion of the light guide plate, the side portion comprising an upper side part and a lower side part; and
   a reflective sheet disposed at a lower portion of the light guide plate and extending in a direction parallel with the light guide plate, wherein the reflective sheet comprises a light controller,
   wherein the light controller comprises a first region overlapping the light guide plate and a second region not overlapping the light guide plate, and a reflectivity of the first region is different from a reflectivity of the second region, and
   wherein the first region substantially absorbs light and the second region substantially reflects light.

2. The backlight unit according to claim 1, wherein the reflectivity of the first region is lower than the reflectivity of the second region.

3. The backlight unit according to claim 1, wherein the first region comprises a black or gray material, and the second region comprises a white material.

4. The backlight unit according to claim 1, wherein the first region comprises a first material and the second region comprises a second material that is different from the first material.

5. The backlight unit according to claim 1, wherein the first region contacts the light guide plate.

6. The backlight unit according to claim 1, wherein a horizontal distance between the light emitting unit and the light controller is about 1 mm or less.

7. The backlight unit according to claim 1, wherein a length of the first region is greater than a length of the second region.

8. A backlight unit of a display device, the backlight unit comprising:
   a light guide plate;
   a light emitting unit configured to irradiate light toward a side portion of the light guide plate, the side portion comprising an upper side part and a lower side part, wherein light emitted from the upper side part of the light guide plate is directed to a display panel of the display device; and
   a reflective sheet disposed at the lower side part of the light guide plate and extending in a direction parallel with the light guide plate, wherein the reflective sheet comprises a light controller,
   wherein the light controller comprises a first region overlapping the light guide plate, and a second region and a third region, both the second and the third regions not overlapping the light guide plate, and a reflectivity of the first region is different from a reflectivity of the third region.

9. The backlight unit according to claim 8, wherein the reflectivity of the first region is lower than the reflectivity of the third region.

10. The backlight unit according to claim 8, wherein the first region and the second region substantially absorbs light and the third region substantially reflects light.

11. The backlight unit according to claim 8, wherein the first region and the second region comprise substantially identical materials, and the first region comprises a first material and the third region comprises a second material that is different from the first material.

12. The backlight unit according to claim 8, wherein the first region contacts the light guide plate.

13. The backlight unit according to claim 8, wherein a horizontal distance between the light emitting unit and the light controller is about 1 mm or less.

14. The backlight unit according to claim 8, wherein a length of the first region is greater than a length of the second region.

15. The backlight unit according to claim 8, wherein a length of the first region is greater than a length of the third region and the length of the third region is greater than a length of the second region.

16. A display device comprising:
   a display panel;
   a backlight unit; and
   a middle mold configured to support the display panel and the backlight unit, the middle mold comprising an extension portion disposed between the display panel and at least a portion of the backlight unit,
   wherein the backlight unit comprises:
      a light guide plate positioned at a rear side of the display panel, the light guide plate comprising an upper portion that is supported by the extension portion of the middle mold;
      a light emitting unit configured to irradiate light toward a side portion of the light guide plate, the side portion comprising an upper side part and a lower side part; and
      a reflective sheet disposed at a lower portion of the light guide plate and extending in a direction parallel with the light guide plate, wherein the reflective sheet comprises a light controller,
wherein the light controller comprises a first region overlapping the light guide plate and a second region not overlapping the light guide plate, and a reflectivity of the first region is different from a reflectivity of the second region, and
wherein the first region substantially absorbs light and the second region substantially reflects light.

17. The display device according to claim 16, wherein the reflectivity of the first region is lower than the reflectivity of the second region.

18. The display device according to claim 16, wherein the first region comprises a black or gray material, and the second region comprises a white material.

19. The display device according to claim 16, wherein the first region comprises a first material and the second region comprises a second material that is different from the first material.

20. The display device according to claim 16, wherein the first region contacts the light guide plate.

21. The display device according to claim 16, wherein a horizontal distance between the light emitting unit and the light controller is about 1 mm or less.

22. The display device according to claim 16, wherein a length of the first region is greater than a length of the second region.

23. A display device comprising:
a display panel;
a light guide plate positioned at a rear side of the display panel;
a light emitting unit configured to irradiate light toward a side portion of the light guide plate, the side portion comprising an upper side part and a lower side part wherein light emitted from the upper side part of the light guide plate is directed to the display panel; and
a reflective sheet disposed at the lower side part of the light guide plate and extending in a direction parallel with the light guide plate, wherein the reflective sheet comprises a light controller,
wherein the light controller comprises a first region overlapping the light guide plate, and a second region and a third region, each not overlapping the light guide plate, and a reflectivity of the first region is different from a reflectivity of the third region.

24. The display device according to claim 23, wherein the reflectivity of the first region is lower than the reflectivity of the third region.

25. The display device according to claim 23, wherein the first region and the second region substantially absorb light and the third region substantially reflects light.

26. The display device according to claim 23, wherein the first region and the second region comprise substantially identical materials, and the first region comprises a first material and the third region comprises a second material that is different from the first material.

27. The display device according to claim 23, wherein the first region contacts the light guide plate.

28. The display device according to claim 23, wherein a horizontal distance between the light emitting unit and the light controller is about 1 mm or less.

29. The display device according to claim 23, wherein a length of the first region is greater than a length of the second region.

30. The display device according to claim 23, wherein a length of the first region is greater than a length of the third region and a length of the third region is greater than a length of the second region.

31. A reflective sheet of a display device, the display device comprising a display panel, a light guide plate, and a light emitting unit, the reflective sheet comprising:
a first reflective region having a first reflectivity; and
a second reflective region having a second reflectivity, wherein the first reflectivity is different from the second reflectivity and the first reflective region is positioned corresponding to an edge portion of the light guide plate,
wherein the first reflective region and the second reflective region do not overlap the light guide plate,
wherein the light guide plate comprises an upper part and a lower part, wherein light emitted from the upper part of the light guide plate is directed to the display panel, and
wherein the reflective sheet is disposed at the lower part of the light guide plate and extends in a direction parallel with the light guide plate.

32. The reflective sheet according to claim 31, wherein first reflectivity is lower than the second reflectivity.

33. The reflective sheet according to claim 31, wherein the first reflective region substantially absorbs the light and the second region substantially reflects the light.

34. The display device according to claim 16, wherein the extension portion of the middle mold comprises a protrusion, and
wherein at least a part of an edge portion of the light controller of the backlight unit is surrounded by the protrusion of the extension portion.

* * * * *